US009750028B2

(12) United States Patent
Soriaga et al.

(10) Patent No.: US 9,750,028 B2
(45) Date of Patent: Aug. 29, 2017

(54) APPARATUS AND METHODS FOR ENHANCED MAXIMUM POWER IN MULTICARRIER WIRELESS COMMUNICATIONS

(71) Applicant: QUALCOMM Incorporated, San Diego, CA (US)

(72) Inventors: Joseph B. Soriaga, San Diego, CA (US); Jun Hu, San Diego, CA (US); Ming Yan, San Diego, CA (US); Christopher Gerard Lott, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

(21) Appl. No.: 13/791,632

(22) Filed: Mar. 8, 2013

(65) Prior Publication Data

US 2014/0105126 A1 Apr. 17, 2014

Related U.S. Application Data

(60) Provisional application No. 61/712,775, filed on Oct. 11, 2012.

(51) Int. Cl.
*H04L 1/00* (2006.01)
*H04L 12/26* (2006.01)
(Continued)

(52) U.S. Cl.
CPC ....... *H04W 72/0473* (2013.01); *H04L 5/0044* (2013.01); *H04W 52/367* (2013.01);
(Continued)

(58) Field of Classification Search
CPC ............. H04W 52/146; H04W 52/346; H04W 52/367; H04W 52/04; H04W 52/365; H04W 52/327; H04W 52/00
(Continued)

(56) References Cited

U.S. PATENT DOCUMENTS 6,185,266 B1 * 2/2001 Kuchi .................. H04B 7/0814
375/347
8,731,595 B2 * 5/2014 Patel .................... H04W 52/367
455/101

(Continued)

FOREIGN PATENT DOCUMENTS

EP 2374316 A2 10/2011
EP 2557708 A1 2/2013
(Continued)

OTHER PUBLICATIONS

Attar R. et al., "Evolution of cdma2000 cellular networks: multicarrier EV-DO", IEEE Communications Magazine, IEEE Service Center, Piscataway, US, vol. 44, No. 3, Mar. 1, 2006, pp. 46-53, XP002415258, ISSN: 0163-6804, DOI: 10.1109/MCOM.2006.1607865.
(Continued)

*Primary Examiner* — Yemane Mesfin
*Assistant Examiner* — Abdelillah Elmejjarmi
(74) *Attorney, Agent, or Firm* — Ashish L. Patel

(57) ABSTRACT

Aspects of the present disclosure are directed to improving maximum transmit power in multi-carrier reverse-link transmission. In one aspect, a method of carrier management for a multi-carrier reverse link transmission is disclosed. A method can include transmitting a reverse link signal on a plurality of carriers, and the reverse link signal including payload data and overhead data. A method can funnel payload data onto a first carrier of the plurality of carriers,
(Continued)

while maintaining transmission of the overhead data on all the carriers of the plurality of carriers. Other aspects, embodiments, and features are also claimed and described.

18 Claims, 6 Drawing Sheets

(51) Int. Cl.
  *H04W 72/04* (2009.01)
  *H04W 52/36* (2009.01)
  *H04W 52/14* (2009.01)
  *H04W 52/34* (2009.01)
  *H04W 52/42* (2009.01)
  *H04L 5/00* (2006.01)
  *H04W 52/24* (2009.01)

(52) U.S. Cl.
  CPC ............ *H04L 5/001* (2013.01); *H04L 5/0053* (2013.01); *H04L 5/0066* (2013.01); *H04W 52/146* (2013.01); *H04W 52/243* (2013.01); *H04W 52/346* (2013.01); *H04W 52/42* (2013.01)

(58) Field of Classification Search
  USPC .................................. 370/329, 236; 455/452
  See application file for complete search history.

(56) References Cited

U.S. PATENT DOCUMENTS

| | | | | |
|---|---|---|---|---|
| 2009/0196196 | A1* | 8/2009 | Ghosh | .................. H04L 5/0044 370/252 |
| 2009/0197632 | A1* | 8/2009 | Ghosh | .................. H04W 52/24 455/522 |
| 2012/0093011 | A1* | 4/2012 | Ranta-Aho | ........... H04L 5/0007 370/252 |
| 2012/0149412 | A1 | 6/2012 | Nergis et al. | |
| 2012/0184327 | A1 | 7/2012 | Love et al. | |
| 2012/0224552 | A1 | 9/2012 | Feuersanger et al. | |
| 2012/0270519 | A1 | 10/2012 | Ngai et al. | |
| 2012/0270592 | A1* | 10/2012 | Ngai | .................. H04W 52/226 455/522 |
| 2012/0329410 | A1* | 12/2012 | Balakrishnan | .......... G06F 1/206 455/127.1 |

FOREIGN PATENT DOCUMENTS

| | | |
|---|---|---|
| WO | WO-2007038729 A2 | 4/2007 |
| WO | 2010051513 A2 | 5/2010 |
| WO | WO-2010124192 A2 | 10/2010 |
| WO | WO-2011125319 A1 | 10/2011 |

OTHER PUBLICATIONS

International Search Report and Written Opinion—PCT/US2013/063745—ISA/EPO—Jan. 16, 2014.

"3GPP TR 36.922, "3rd Generation Partnership Project; Technical Specification Group Radio Access Network; Evolved Universal Terrestrial Radio Access (E-UTRA); TDD Home eNode B (HeNB) Radio Frequency (RF) requirements Analysis", (Release 10), V10.0.0, Apr. 2011, 74 Pages.", 2011, 74 Pages.

* cited by examiner

APPARATUS AND METHODS FOR ENHANCED MAXIMUM POWER IN MULTICARRIER WIRELESS COMMUNICATIONS

CROSS-REFERENCE TO RELATED APPLICATION & PRIORITY CLAIM

This application claims priority to and the benefit of U.S. Provisional Patent Application No. 61/712,775 filed Oct. 11, 2012, the entire content of which is incorporated herein by reference as if fully set forth below and for all applicable purposes.

TECHNICAL FIELD

The technology discussed below relates generally to wireless communications, and more particularly, to apparatus and methods for enhanced maximum power in multicarrier wireless communications.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems (e.g., CDMA2000), time-division multiple access (TDMA) systems, frequency-division multiple access (FDMA) systems and orthogonal frequency-division multiple access (OFDMA) systems.

Enhanced Voice-Data Optimized (EV-DO) Rev. A is an evolution of the CDMA2000 standard that can support high data rates and is deployed alongside a wireless carrier's voice services. EV-DO Rev. B is a multi-carrier evolution of the Rev. A specification and maintains the capabilities of EV-DO Rev. A. EV-DO Rev. B provides higher rates per carrier and higher rates by bundling multiple carriers together. Typical deployments may include 2 or 3 carriers for a peak rate of, for example, 14.7 Mbit/s. EV-DO Rev. B has reduced latency by using statistical multiplexing across channels, increased talk-time and standby time, reduced interference from the adjacent sectors especially to users at the edge of the cell signal which improves the rates that can be offered by using hybrid frequency re-use.

In conventional multi-carrier reverse-link (RL) transmission in EV-DO Rev. B, the waveform is generally driven through a single power amplifier at an access terminal. An issue with this configuration is that it can suffer from intermodulation distortion, resulting in a substantial amount of out-of-band interference, particularly when both carriers are configured with equal transmit powers. That is, with equal transmit power on dual carriers, out-of-band emission is the highest. This out-of-band interference can desense a receiver on the forward link, as well as violating certain spectral masks, that is, regulations on the amount of interference allowed on other bands.

BRIEF SUMMARY OF SOME SAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to improving maximum transmit power in multi-carrier reverse-link transmission. In one aspect, a method of carrier management for a multi-carrier reverse link transmission is disclosed. The method includes transmitting a reverse link signal on a plurality of carriers, and the reverse link signal including payload data and overhead data. The method funnels all of the payload data onto a first carrier of the plurality of carriers, while maintaining transmission of the overhead data on all the carriers of the plurality of carriers.

Another aspect of the disclosure provides an apparatus configured for multi-carrier reverse link transmission in a wireless communication network. The apparatus includes means for transmitting a reverse link signal on a plurality of carriers, the reverse link signal including payload data and overhead data; and means for funneling all of the payload data onto a first carrier of the plurality of carriers, while maintaining transmission of the overhead data on all the carriers of the plurality of carriers.

Another aspect of the disclosure provides a computer program product, including: a computer-readable storage medium including code for causing an access terminal, for managing a multi-carrier link transmission, to: transmit a reverse link signal on a plurality of carriers, the reverse link signal comprising payload data and overhead data; and funnel all of the payload data onto a first carrier of the plurality of carriers, while maintaining transmission of the overhead data on all the carriers of the plurality of carriers.

Another aspect of the disclosure provides an apparatus configured for multi-carrier reverse link transmission in a wireless communication network. The apparatus includes at least one processor, a communication interface coupled to the at least one processor, and a memory coupled to the at least one processor. The at least one processor is configured to: transmit a reverse link signal on a plurality of carriers, the reverse link signal including payload data and overhead data; and funnel all of the payload data onto a first carrier of the plurality of carriers, while maintaining transmission of the overhead data on all the carriers of the plurality of carriers.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) CDMA2000 (C2K) protocols and systems, and related terminology may be found in much of the following description. However, those of ordinary skill in the art will recognize that one or more aspects of the present disclosure may be employed and included in one or more other wireless communication protocols and systems such as Universal Mobile Telecommunications System (UMTS).

Figure 1:
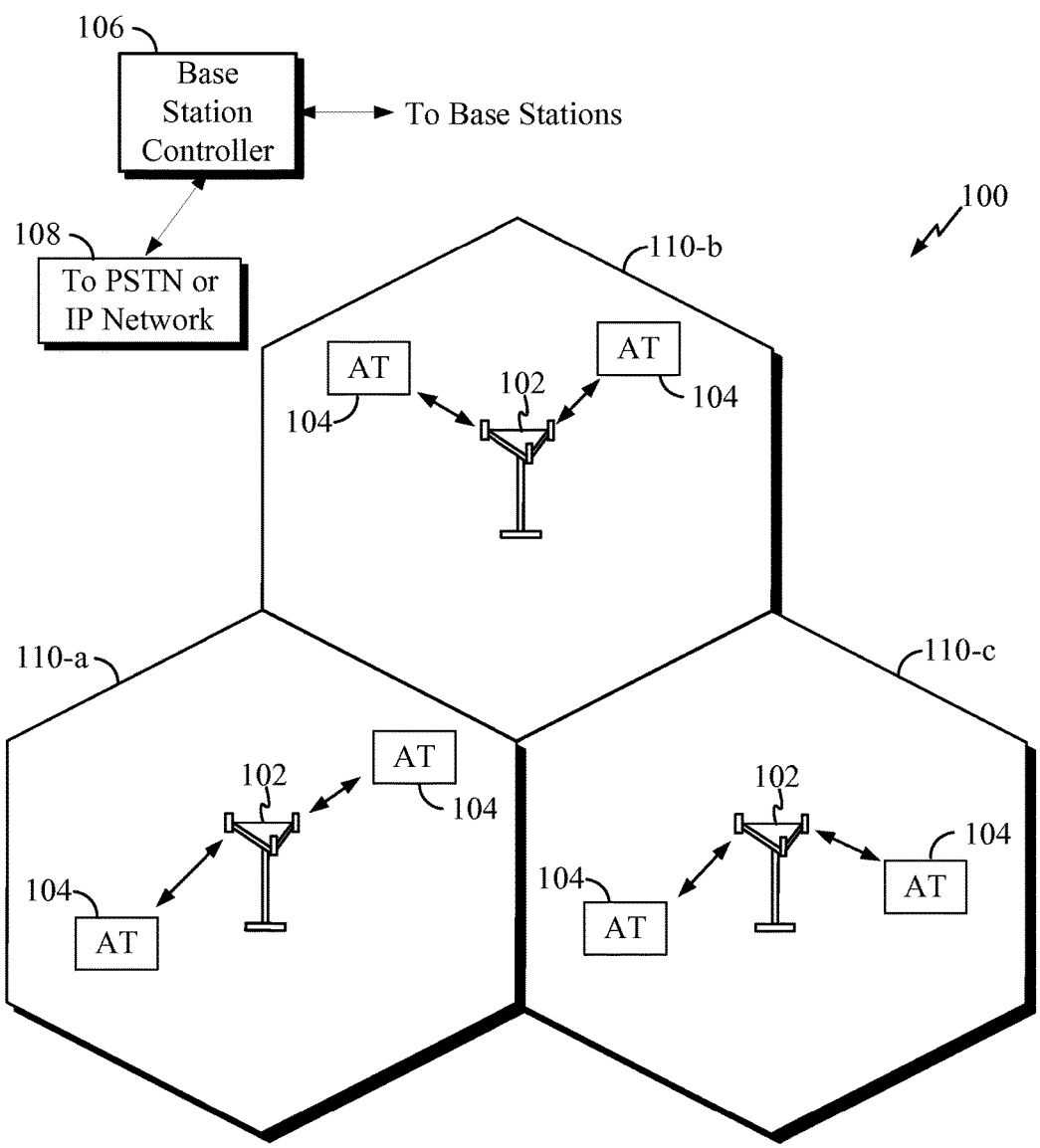
FIG. 1 is a block diagram illustrating an example of a network environment in which one or more aspects of the present disclosure may find application.

FIG. 1 is a block diagram illustrating an example of a C2K network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)).

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via one or more carriers. Each of the base stations 102 can provide communication coverage for a respective geographic area. The coverage area 110 for each base station 102 here is identified as cells 110-a, 110-b, or 110-c, for example. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion or sector of the cell.

One or more access terminals 104 may be dispersed throughout the coverage areas 110, and may wirelessly communicate with one or more sectors associated with each respective base station 102. An access terminal 104 (AT) may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology.

The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
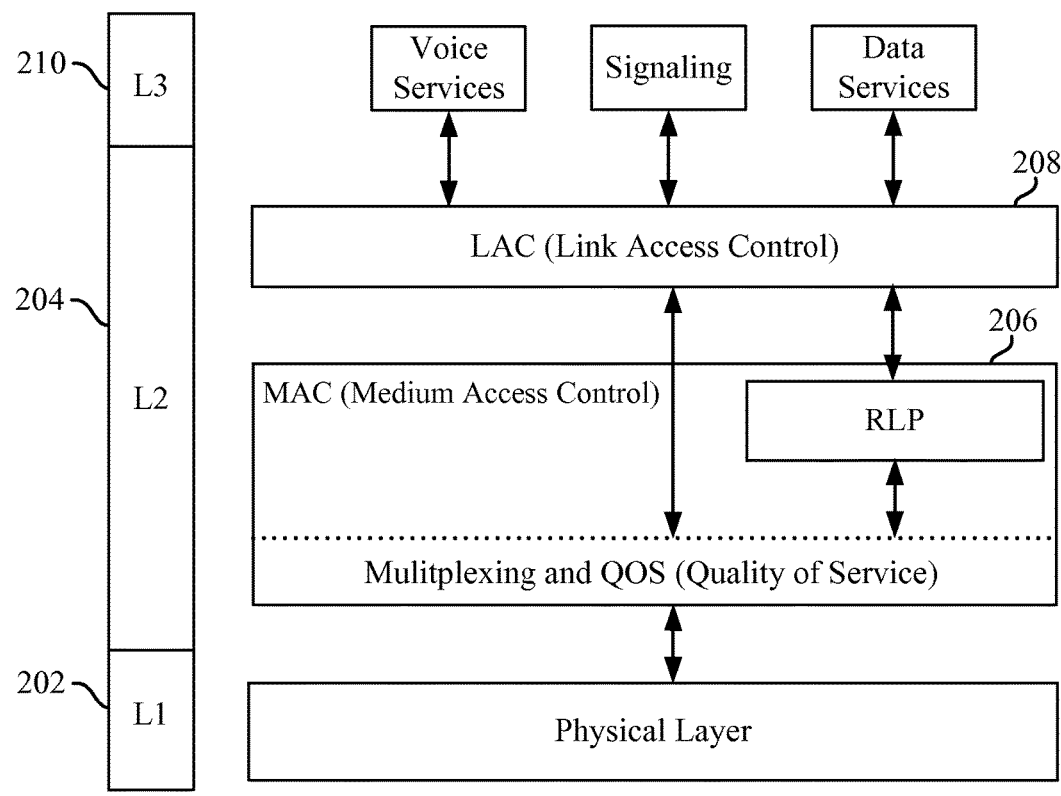
FIG. 2 is a block diagram illustrating an example of a protocol stack architecture which may be implemented by an access terminal according to some embodiments.

The access terminal 104 may be adapted to employ a protocol stack architecture for communicating data between the access terminal 104 and one or more network nodes of the wireless communication system 100 (e.g., the base station 102, base station controller 106). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between an access terminal 104 and a base station 102 via an air interface.

The data link layer, called Layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units or payload using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the Layer 3. The LAC sublayer 208 makes use of the services provided by the lower layers (e.g., Layer 1 and the MAC sublayer).

Layer 3 210, which may also be referred to as the upper layer or the L3 layer, originates and terminates signaling messages according to the semantics and timing of the communication protocol between a base station 102 and an access terminal 104. The L3 layer 210 makes use of the services provided by the L2 layer 204. Information (both data and voice) messages are also passed through the L3 layer 210.

When an access terminal 104 operates within the communication system 100, the access terminal 104 may operate in any of various states of operation, including an idle state and a system access state. In the system access state, the access terminal 104 may actively exchange data (e.g., voice or data calls or sessions) with one or more base stations (e.g., base station 102 in FIG. 1). In the idle state, the access terminal 104 may monitor control channels, including but not limited to one or more of a common control channel (F-CCCH) and a broadcast control channel (F-BCCH) for carrying signaling data, a paging channel (F-PCH) for carrying system and overhead data such as paging messages, and/or a quick paging channel (F-QPCH) for letting the access terminal 104 know whether or not to receive the F-CCCH or the F-PCH in the next slot. The paging messages carried on the F-PCH (referred to herein as the PCH for brevity) may include messages that alert the access terminal 104 to the occurrence of an incoming voice or data call and control/overhead messages that carry system information and other information for the access terminal 104.

Figure 3:
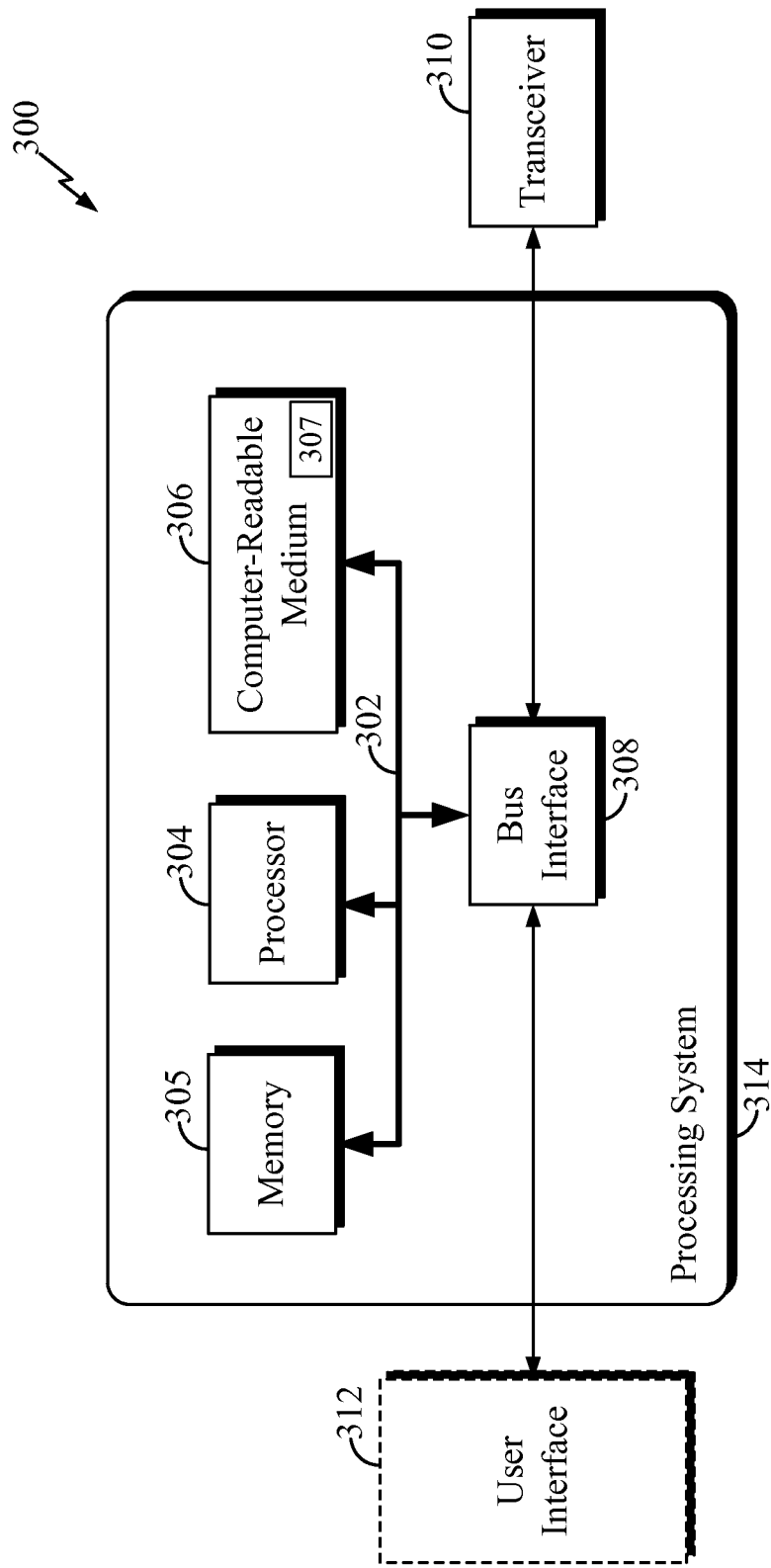
FIG. 3 is a conceptual diagram illustrating an example of a hardware implementation for an access terminal configured for multi-carrier operation according to some embodiments.

FIG. 3 is a conceptual diagram illustrating an example of a hardware implementation of an access terminal (AT) 300 that can be configured for multi-carrier operation in an EV-DO Rev. B network. For example, the access terminal 300 may be used as the access terminal 104. In accordance with various aspects of the disclosure, an element, or any portion of an element, or any combination of elements may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 (e.g., a communication interface) provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software 307 stored on the computer-readable medium 306. The software, when executed by the processor 304, causes the processing system 314 to perform the various functions described infra for any particular apparatus. For example, the processing system may be utilized to perform enhanced maximum transmit power algorithms for multicarrier reverse link (RL) transmission to be described in more detail below. The computer-readable medium 306 may also be used for storing data that is manipulated by the processor 304 when executing software. For example, the computer-readable medium 306 may be used to store enhanced maximum power algorithms for multicarrier RL transmission to be described in more detail below.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium.

The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The access terminal 300 may be configured to support multi-carrier RL transmission in an EV-DO Rev. B network. However, the present disclosure is not limited to EV-DO Rev. B. In other aspects, the access terminal 300 may be configured to support any suitable access network. In such multi-carrier implementation, a maximum transmit power limit may be set for the RL transmission.

In the related art, this limit is typically based on an assumption that the worst-case scenario exists with respect to out-of-band interference, that is, there is an equal power allocation across all active carriers. At close to the maximum transmit power limit (i.e., in a power amplifier "headroom limited" situation), the access terminal may switch to a single-carrier mode of operation in which all RL data is transmitted by a single carrier.

In a conventional access terminal configured to operate in multi-carrier mode, the maximum transmit power limit is generally set to a much lower value compared to that of the single carrier mode, sometimes even as low as 13 dBm for example because it is based on the worst-case scenario in which equal power is allocated on each carrier. Therefore, the maximum power limit that was measured under the worst-case equal power assumption can be overly conservative, leading to reduced throughput on the reverse-link, and reduced multi-carrier coverage on the forward link.

According to aspects of the present disclosure, performance gains may be achieved by transmitting all payload data of a multi-carrier RL transmission on one carrier while maintaining overhead data (e.g., signaling data) on all carriers among a plurality of carriers. Hereafter, this allocation of payload data and overhead data among the carriers is referred to as "funneling," "funnel," or similar terms throughout this disclosure. According to aspects of the disclosure, the maximum transmit power limit may be optimized based on the transmit power imbalance induced in this headroom limited regime, where the imbalance typically can range from 10-20 dB, for example. In some aspects of this disclosure, an algorithm is provided that takes advantage of the imbalance from funneling.

Figure 4:
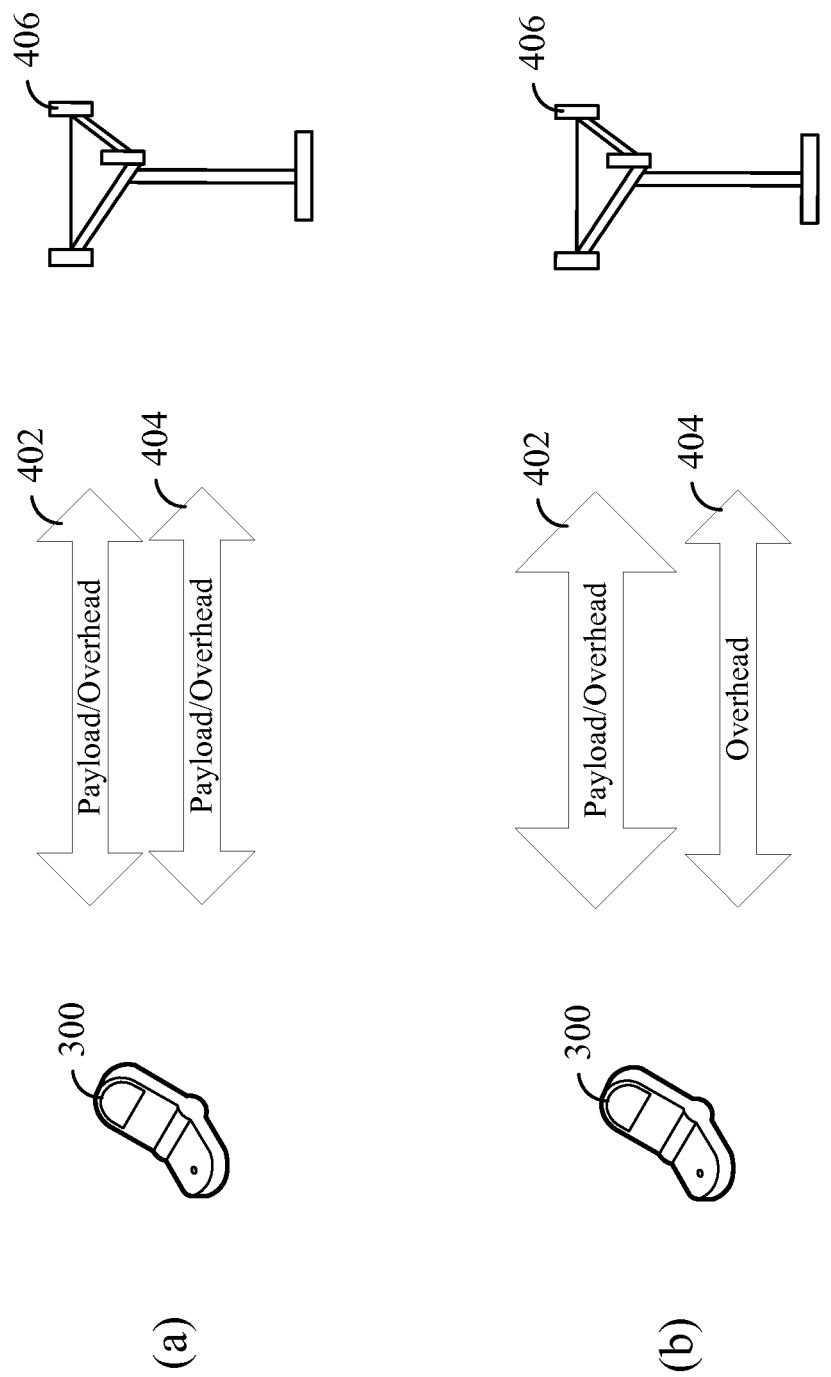
FIG. 4 is a drawing illustrating an access terminal capable of multi-carrier reverse link (RL) transmission according to some embodiments.

FIG. 4 is a schematic illustration showing an access terminal (AT) 300 that is configured to utilize multiple carriers, e.g., dual carriers 402 and 404, for RL transmission in an EV-DO Rev. B network, in accordance with aspects of the disclosure. In case (a), when the total transmit power of the AT 300 is less than a threshold (e.g., maximum power amplifier transmit power), the AT 300 may use both carriers 402 and 404 for transmitting RL data to a base station 406 (e.g., base station 102). The RL data may include both payload data and overhead data (non-payload data) on both carriers 402 and 404. In this case, the AT 300 may utilize any suitable transmission power, e.g., in accordance with received power control commands, including but not limited to transmitting at substantially the same power on both carriers 402 and 404.

In case (b), when the total transmit power of the AT 300 is close to or at a threshold (e.g., headroom limited), the AT 300 may utilize a funneling operation in which the AT 300 allocates almost all the power to one of the carriers (e.g., about 90% to 99%). However, in an aspect of the disclosure, the other carrier may be allocated very little power (e.g., 10% or less) and may be utilized, for example, only for carrying overhead data (e.g., non-payload data). During this funneling operation, in case (b), all the payload data may be transmitted on carrier 402 only, while overhead data or non-payload data may be transmitted on both carrier 402 and carrier 404. While FIG. 4 only shows only two carriers (402 and 404), other aspects may utilize three or more carriers. In examples using three or more carriers for RL transmission, the overhead data may be transmitted on all carriers while the payload data is transmitted on one carrier only.

In one aspect, if the carrier power of one carrier (e.g., carrier 404) is substantially smaller than that of the other carrier (e.g., carrier 402), the out-of-band emissions, which may correspond to a product of the two carriers, may be substantially reduced. Accordingly, when funneling occurs, the maximum transmit power may be dynamically adjusted based on the per-carrier transmit power measured for the non-data bearing carrier(s) (e.g., carrier 404). In one example, the maximum transmit power limit when funneling may be defined as a dynamic function of the transmit power among non-data bearing carrier(s) (e.g., carrier 404). In various aspects, any data allocation resulting in a total transmit power below the maximum transmit power limit will induce both a transmit power differential and a transmit total power, which together allow the system to meet the desired emissions requirements.

By utilizing this data funneling method, the maximum transmit power limit may be increased above the limit that is typically achievable in allocating power equally among channels, if this increase results in a large enough transmit power differential between the two carriers 402 and 404 to meet the out-of-band emissions requirements. In addition, based on the full characterization of the maximum transmit power under imbalance, the carrier management algorithm can bias the funneling of the RL data to one carrier, which allows for a larger maximum transmit power limit. Furthermore, since the maximum transmit power limit can be increased, substantial improvement can be achieved over legacy systems in terms of multi-carrier coverage (i.e., the data rate), reverse link throughput, application performance (i.e., user experience), as well as battery life.

Figure 5:
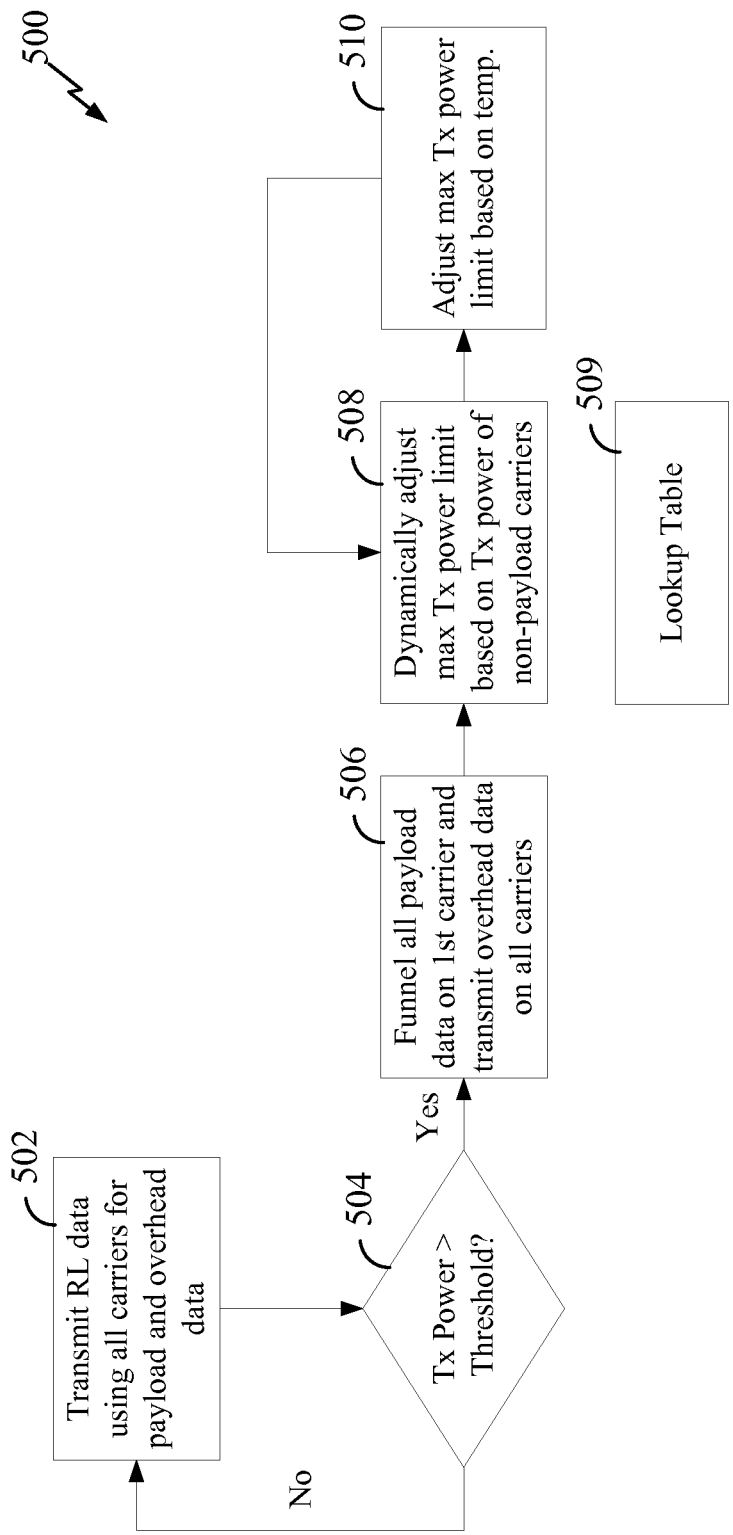
FIG. 5 is a flow chart illustrating an algorithm of carrier management for enhanced maximum power in RL transmission in a multicarrier wireless communications network according to some embodiments.

FIG. 5 is a flow chart illustrating an algorithm 500 for carrier management for enhanced maximum power in RL transmission in a multi-carrier wireless communications network in accordance with an aspect of the disclosure. In one nonlimiting example, the method may be utilized by an access terminal (e.g., AT 300) to communicate with a base station (e.g., base station 102) in an EV-DO Rev. B network. In block 502, an access terminal may utilize a number of carriers (e.g., first and second carriers) for RL transmission to a base station. Here, each carrier may be utilized to transmit both payload data and overhead data (i.e., non-payload data such as signaling data) at substantially equal power. In block 504, it is determined whether the total transmit (Tx) power of the carriers is greater than a threshold (e.g., a current maximum Tx power limit or headroom limit of a power amplifier). If the total Tx power is not greater than the threshold, the algorithm continues back to block 502. If the total Tx power is determined to be greater than the threshold, the algorithm continues to block 506. In block 506, the access terminal funnels all of the payload data onto a first carrier (e.g., carrier 402) while maintaining transmission of the overhead data or non-payload data on all carriers (e.g., carrier 402 and carrier 404). During funneling, most of the Tx power is allocated to the first carrier, and very little power is allocated to the second carrier. (e.g., 90% to 99% allocated to the first carrier).

In block 508, the access terminal may dynamically adjust the maximum Tx power limit of the carriers based on measured Tx power of the non-payload bearing carrier(s) (e.g., the first and second carriers). That is, the maximum Tx power limit is a function of the measured Tx power of non-payload bearing carrier(s) during funneling. In one aspect, the access terminal may utilize a lookup table 509 in block 508. The table 509 characterizes the maximum Tx power limit of the carriers as a function of the Tx power of the non-payload bearing carrier(s). In block 510, the maximum Tx power limit may be adjusted in accordance with one or more operational parameters, such as a temperature at the access terminal. While FIG. 5 illustrates an algorithm in a particular order and sequence, the algorithm may be performed in other orders and sequences in accordance with other aspects of the disclosure.

Figure 6:
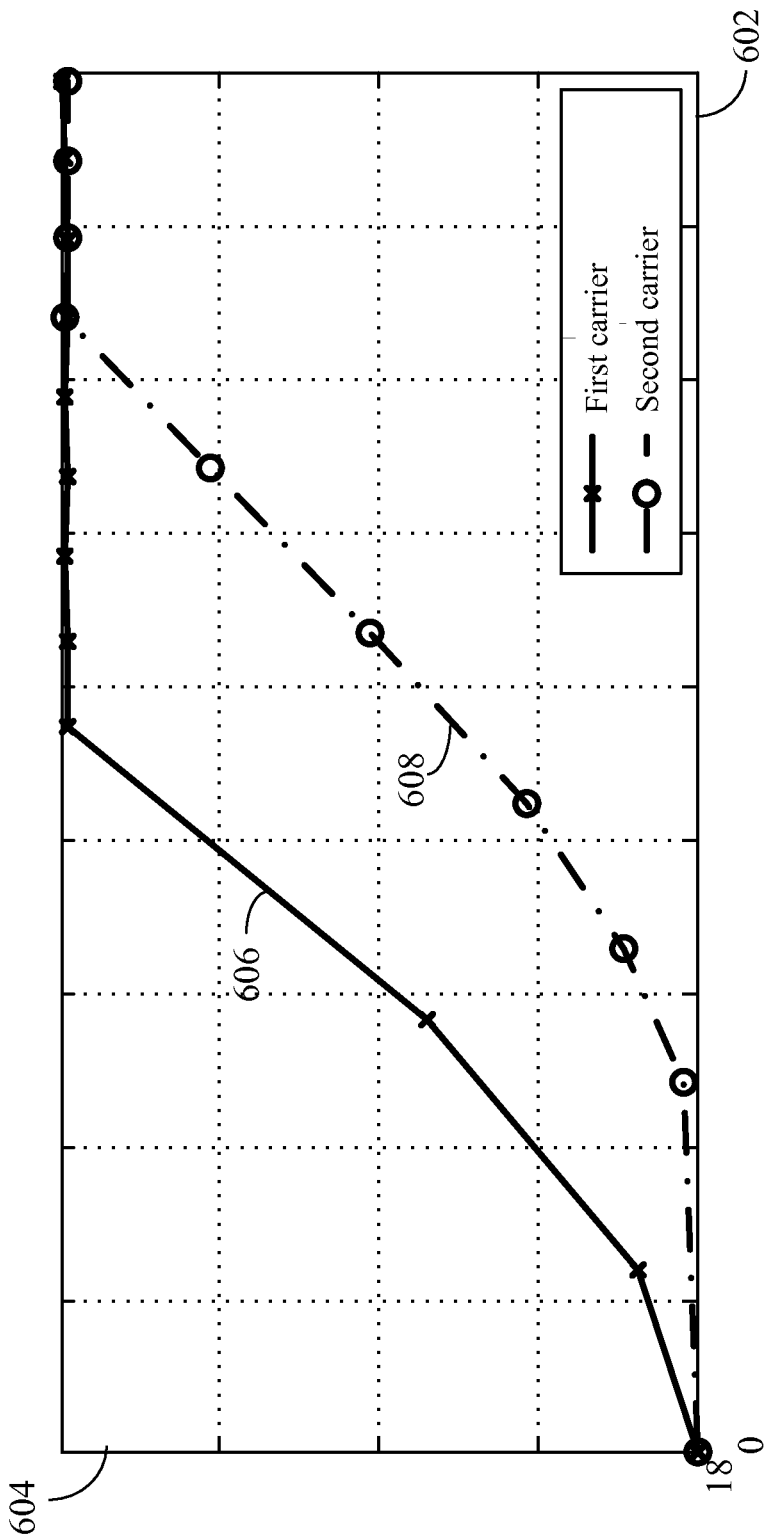
FIG. 6 is a drawing illustrating the maximum transmit power limit of a multi-carrier RL transmission as a function of the imbalance of carriers according to some embodiments.

FIG. 6 is a chart illustrating the maximum Tx power limit of an access terminal configured for multi-carrier RL transmission as a function of the imbalance of carriers in accordance with an aspect of the present disclosure. In FIG. 6, the axis 602 represents the imbalance of the carriers, and the axis 604 represents the maximum Tx power limit. The imbalance corresponds to a difference between the Tx power of two carriers. In some aspects, more than one carrier may be used for transmitting overhead data. In some aspects, an access terminal (e.g., AT 300) may utilize more than two carriers (e.g., 3 or more carriers) for RL transmission, and the access terminal selects a carrier from among the carriers to funnel RL payload data based on the characterization of the carriers. FIG. 6 is a drawing conceptually illustrating carrier characterization in accordance with aspects of the disclosure. The first carrier curve 606 is the characterization of maximum Tx power limit as a function of the imbalance under the assumption that the payload data carrier is at the higher frequency of the two carriers. The second carrier curve 608 is the characterization for the case where the payload-data carrier is at the lower frequency.

In some aspects, the access terminal may bias funneling to a carrier from among a number of carriers based on a lookup table that maps a maximum Tx power limit versus an imbalance in transmit power among the carriers. In some aspects, the access terminal may characterize the transmit power limit for each carrier to be selected for funneling the payload data. The characterization may be determined based on band class, frequency subband, etc. For example, the maximum Tx power limit may be characterized in terms of the imbalance between the payload data and overhead data carriers, or equivalently in terms of the Tx power of the overhead data carriers.

For a given Tx power on the non-payload bearing carriers, characterization is made to ensure total Tx power for all the carriers are below a suitable limit to meet desired emission requirements. The resulting maximum Tx power limit while still meeting emission requirements, as a function of the Tx power of all other carriers for carrying the overhead (non-payload) data only, may be stored in a lookup table (e.g., lookup table 509) in the memory (e.g., memory 305). Moreover, a separate lookup table may be used for each case where the payload data is on each of the available carriers. This further allows the access terminal to bias funneling of the payload data to a carrier having a higher characterized maximum transmit power limit than the other carriers, by comparing the maximum Tx power limit across each of these cases. For example, the lookup table can map a maximum transmit power limit versus an imbalance in transmit power between among the carriers.

In one configuration, an access terminal (e.g., AT 300) for wireless communication includes means for transmitting a reverse link signal on a plurality of carriers (e.g., carriers 402, 404), the reverse link signal including payload data and overhead data; and means for funneling all of the payload data onto a first carrier (e.g., carrier 402) of the plurality of carriers, while maintaining transmission of the overhead data on all carriers (e.g., carrier 402 and carrier 404) of the plurality of carriers. In another configuration, the access terminal 300 includes means for dynamically adjusting a maximum transmit power limit of the carriers based on a measured transmit power of the second carrier. In one aspect, the aforementioned means may be the processor(s) 304 in which the invention resides from FIG. 3 configured to perform the functions recited by the aforementioned means. In another aspect, the aforementioned means may be a module or any apparatus configured to perform the functions recited by the aforementioned means.

Several aspects of a telecommunications system have been presented with reference to a CDMA2000 system. As those skilled in the art will readily appreciate, various aspects described throughout this disclosure may be extended to other telecommunication systems, network architectures and communication standards.

By way of example, various aspects may be extended to UMTS systems such as W-CDMA, TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method of carrier management for a multi-carrier reverse link transmission, the method comprising:
    transmitting a reverse link signal on a plurality of carriers, the reverse link signal comprising payload data and overhead data on each of the plurality of carriers;
    determining that a total transmit power on the plurality of carriers is greater than a maximum transmit power limit;

if the total transmit power on the plurality of carriers is greater than the maximum transmit power limit, funneling all of the payload data onto a first carrier of the plurality of carriers, while maintaining transmission of the overhead data on all the carriers of the plurality of carriers; and dynamically adjusting the maximum transmit power limit of the plurality of carriers based on a lookup table that maps the maximum transmit power limit in accordance with an imbalance between a transmit power of the first carrier and a transmit power of a non-payload bearing carrier of the plurality of carriers.

2. The method of claim 1, further comprising: characterizing the maximum transmit power limit for each of the carriers to be selected for funneling all of the payload data.

3. The method of claim 2, wherein the characterizing further comprises: determining the maximum transmit power limit for each of the carriers based on band class, frequency subband, or combinations thereof.

4. The method of claim 2, wherein the funneling further comprises: biasing funneling of the payload data to a carrier having a higher characterized maximum transmit power limit than other carriers, among the plurality of carriers.

5. The method of claim 2, wherein the characterizing further comprises: comparing the maximum transmit power limit for each carrier for carrying the payload data while meeting emission requirements, with a transmit power of the other carriers for carrying the overhead data only, among the plurality of carriers.

6. The method of claim 1, wherein the adjusting further comprises compensating the adjusted maximum transmit power limit for temperature variations.

7. A computer program product, comprising:
a non-transitory computer-readable storage medium comprising code for causing an access terminal, for managing a multi-carrier link transmission, to:
transmit a reverse link signal on a plurality of carriers, the reverse link signal comprising payload data and overhead data on each of the plurality of carriers;
determine that a total transmit power on the plurality of carriers is greater than a maximum transmit power limit;
if the total transmit power on the plurality of carriers is greater than the maximum transmit power limit, funnel all of the payload data onto a first carrier of the plurality of carriers, while maintaining transmission of the overhead data on all the carriers of the plurality of carriers, carriers; and
dynamically adjust the maximum transmit power limit of the plurality of carriers based on a lookup table that maps the maximum transmit power limit in accordance with an imbalance between a transmit power of the first carrier and a transmit power of a non-payload bearing carrier of the plurality of carriers.

8. The computer program product of claim 7, wherein the non-transitory computer-readable storage medium further comprises code for causing the access terminal to characterize the maximum transmit power limit for each of the carriers to be selected for funneling all of the payload data.

9. The computer program product of claim 8, wherein the non-transitory computer-readable storage medium further comprises code for causing the access terminal to determine the maximum transmit power limit for each of the carriers based on band class, frequency subband, or combinations thereof.

10. The computer program product of claim 8, wherein the non-transitory computer-readable storage medium further comprises code for causing the access terminal to bias funneling of the payload data to a carrier having a higher characterized maximum transmit power limit than other carriers, among the plurality of carriers.

11. The computer program product of claim 8, wherein the non-transitory computer-readable storage medium further comprises code for causing the access terminal to compare the maximum transmit power limit for each carrier for carrying the payload data while meeting emission requirements, with a transmit power of the other carriers for carrying the overhead data only, among the plurality of carriers.

12. The computer program product of claim 7, wherein the non-transitory computer-readable storage medium further comprises code for causing the access terminal to compensate the adjusted maximum transmit power limit for temperature variations.

13. An apparatus configured for multi-carrier reverse link transmission in a wireless communication network, comprising:
at least one processor;
a communication interface coupled to the at least one processor; and
a memory coupled to the at least one processor,
wherein the at least one processor is configured to:
transmit a reverse link signal on a plurality of carriers, the reverse link signal comprising payload data and overhead data on each of the plurality of carriers;
determine that a total transmit power on the plurality of carriers is greater than a maximum transmit power limit;
if the total transmit power on the plurality of carriers is greater than the maximum transmit power limit, funnel all of the payload data onto a first carrier of the plurality of carriers, while maintaining transmission of the overhead data on all the carriers of the plurality of carriers; and
dynamically adjust the maximum transmit power limit of the plurality of carriers based on a lookup table that maps the maximum transmit power limit in accordance with an imbalance between a transmit power of the first carrier and a transmit power of a non-payload bearing carrier of the plurality of carriers.

14. The apparatus of claim 13, wherein the at least one processor is further configured to characterize the maximum transmit power limit for each of the carriers to be selected for funneling all of the payload data.

15. The apparatus of claim 14, wherein the at least one processor is further configured to determine the maximum transmit power limit for each of the carriers based on band class, frequency subband, or combinations thereof.

16. The apparatus of claim 14, wherein the at least one processor is further configured to bias funneling of the payload data to a carrier having a higher characterized maximum transmit power limit than other carriers, among the plurality of carriers.

17. The apparatus of claim 14, wherein the at least one processor is further configured to compare the maximum transmit power limit for each carrier for carrying the payload data while meeting emission requirements, with a transmit power of the other carriers for carrying the overhead data only, among the plurality of carriers.

18. The apparatus of claim 13, wherein the at least one processor is further configured to compensate the adjusted maximum transmit power limit for temperature variations.

* * * * *